US006022133A

United States Patent [19]
Herring et al.

[11] Patent Number: 6,022,133
[45] Date of Patent: Feb. 8, 2000

[54] MULTIPLE-SCREW EXTRUDER

[75] Inventors: Ray A. Herring, Angleton; Richard O. Kirk, Lake Jackson, both of Tex.; Forest Busby, Midland, Mich.; Kathryn S. Jones, Clarksville, N.Y.

[73] Assignee: The Dow Chemical Company, Midland, Mich.

[21] Appl. No.: 08/935,626

[22] Filed: Sep. 23, 1997

Related U.S. Application Data

[60] Provisional application No. 60/026,615, Sep. 24, 1996.

[51] Int. Cl.[7] .................................................... B29B 7/48
[52] U.S. Cl. .................................. 366/85; 366/88; 366/90
[58] Field of Search .................................. 366/85, 86, 88, 366/89, 90, 301, 321; 425/208, 204

[56] References Cited

U.S. PATENT DOCUMENTS

| | | | |
|---|---|---|---|
| 3,104,420 | 9/1963 | Selbach | 366/85 |
| 3,407,438 | 10/1968 | Selbach | 366/88 |
| 3,608,868 | 9/1971 | Koch | 366/85 |
| 3,667,733 | 6/1972 | Fritsch | 366/85 |
| 3,873,070 | 3/1975 | Beken et al. | 366/301 |
| 4,192,617 | 3/1980 | Spielhoff | 366/301 |
| 4,300,839 | 11/1981 | Sakagami . | |
| 4,416,606 | 11/1983 | Sugano et al. | 366/321 |
| 4,423,960 | 1/1984 | Anders . | |
| 4,900,156 | 2/1990 | Bauer . | |
| 5,499,870 | 3/1996 | Rockstedt | 366/85 |

FOREIGN PATENT DOCUMENTS

| | | | |
|---|---|---|---|
| 0049835 | 4/1982 | European Pat. Off. . | |
| 1529828 | 1/1970 | Germany . | |
| 55-137941 | 10/1980 | Japan . | |
| 56-056841 | 5/1981 | Japan . | |
| 57-75126 | 5/1982 | Japan | 366/85 |
| 61-171319 | 8/1986 | Japan . | |
| 1634511 | 3/1991 | U.S.S.R. | 366/85 |

OTHER PUBLICATIONS

JP 56–056841 (Abstract Only).
JP 55–137941 (Abstract Only).
JP 61–171319 (Abstract Only).
R. Friedrich, "Powder Compression with Co–Rotating Twin–Screw Extruders", *Journal of Powder & Bulk Solids Technology*, No. 4, 1980, pp. 27–32.
F. G. Martelli et al., "Twin–Screw Extruders: A Basic Understanding", pp. 21–23, 31–32, 34–35, 42, 69–72, 93, 1983.
C. Rauwendaal, "How to Select the Right Twin–Screw Extruder", *Plastics World*, pp. 58–60, 62–63, Dec. 1993.
L. N. Valsamis and E. L. Canedo, "Compounding of Glass Reinforced Plastics in Corotating Intermeshing Twin–Screw Extruder with Novel Mixing Sections", Society of Plastics Engineers Conference Proceedings/Antec 96', May 5–10, pp.376–380.
R. J. Nichols and F. Kher–adi, "Melting in CRT twin–screw extruders", *Modern Plastics*, vol. 61, No. 2, pp. 70,72,74, Feb. 1984.
M. L. Booy, "Isothermal Flow of Viscous Liquids in Corotating Twin Screw Devices", *Polymer Engineering and Science*, vol. 20, No. 18, pp. 1220–1228, Dec. 1980.
*Plastics Formulating & Compounding*, Oct./Nov. 1995.
C. Rauwendal, "Twin–Screw Extruders", *Polymer Extrusion*, pp. 459–464, 466, 470, 475–477, 485–486.

*Primary Examiner*—Tony G. Soohoo

[57] ABSTRACT

A multiple-screw extruder in which paired co-rating screws, or segments thereof, contain unequal numbers of flights; and a screw for use in such extruder.

11 Claims, 11 Drawing Sheets

MULTIPLE-SCREW EXTRUDER

This is a continuation application of a provisional application 60/026,615 filed on Sep. 24, 1996.

FIELD OF THE INVENTION

This invention relates to a multiple-screw extruder, and to a screw, including segments thereof, for use therein.

BACKGROUND OF THE INVENTION

A multiple-screw extruder is a commonly used instrument for the plastication, mixing and/or pumping of extrudable material, such as polymeric material or other kinds of viscous material such as dough. Polymeric materials are useful for the fabrication of a variety of molded or shaped articles. Plastication refers to the softening of polymeric material to such an extent that it flows freely and will assume any shape. In the case of polymeric material which is crystalline, plastication is synonymous with melting. In the case of polymeric material which is amorphous, plastication occurs at or about the glass transition temperature ("$T_g$") thereof. (Reference below to "polymeric material" may be read also as a reference in the appropriate sense to other kinds of extrudable material.)

Figure 1:
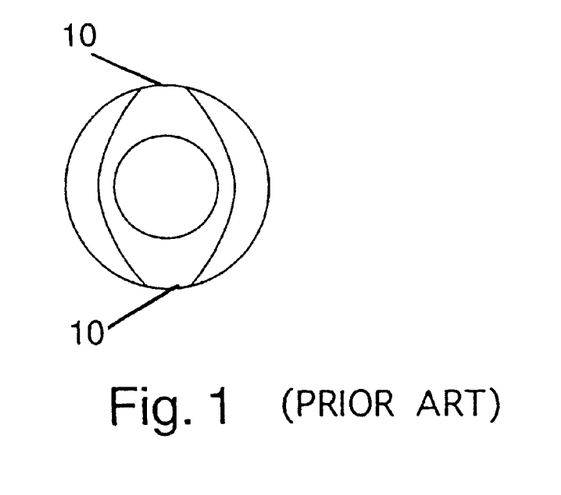
FIG. 1 is a cross-sectional view of a 2-flighted screw.

A multiple-screw extruder contains two or more screws, each of which is similar in various basic respects to that which is used in a single-screw extruder. Such a screw is shaped generally in the form of an elongated cylinder, and has one or more raised ridges helically disposed thereabout, each of which is a "flight". A flight may have forward or reverse pitch, and the degree of pitch may be varied. The surface of the screw above which the flight(s) are raised is the root of the screw. When the screw is viewed in cross section (i.e. in a plane perpendicular to its longitudinal axis), the course of a particular flight, between one point of intersection with a line parallel to the screw axis and the next closest point of intersection of the flight with such line, defines a 360° circle. The pointed or rounded tip which extends toward the perimeter of the circular cross section defines a "lobe" above the root of the screw. The lobes 10 in a cross-sectional view of a 2-flighted screw are shown in FIG. 1. The distance in the longitudinal (axial) direction along the screw, between one point on a line intersecting a particular flight and the next closest point of intersection of such line with the same flight, is one turn of the screw. The space bounded by the root of the screw and the side walls of any two flights is a channel of the screw. The side wall of a flight may, if desired, be undercut such that the channel does not, as so modified, conform to the Erdmenger profile. The screw rotates on its longitudinal axis within a barrel or sleeve, which may be generally described as the bore of an annular cylinder.

The plasticating screw typically has an initial, feed section which begins the process of conveying solid polymeric material forward within the barrel of the extruder. Polymeric material may be flood fed into the extruder by means of a hopper which empties into the barrel, or may be metered into the barrel through a feed chute or a side feeder. The direction of travel of the polymeric material in the barrel as it is transported away from the feed port by the screw is considered the "downstream" direction. The feed section of the screw is typically followed, with or without other intervening sections, by a melting section in which partial or complete plastication of the polymeric material occurs. Plastication of the polymeric material occurs as a result of the combined effect of conductive heat produced, for example, by heater bands mounted on the outside of the extruder barrel and the physical deformation (or viscous heating) to which screw action subjects the polymeric material. The melting section of the screw is typically followed, again with or without other intervening sections, by a metering section which functions to pump the plasticated material, as extrudate, out through the downstream end of the extruder, which typically contains a die or some other form of restricted orifice. The sections of the extruder and screw through which the polymeric material travels before it reaches the die are considered to be "upstream" from the die.

Figure 2:
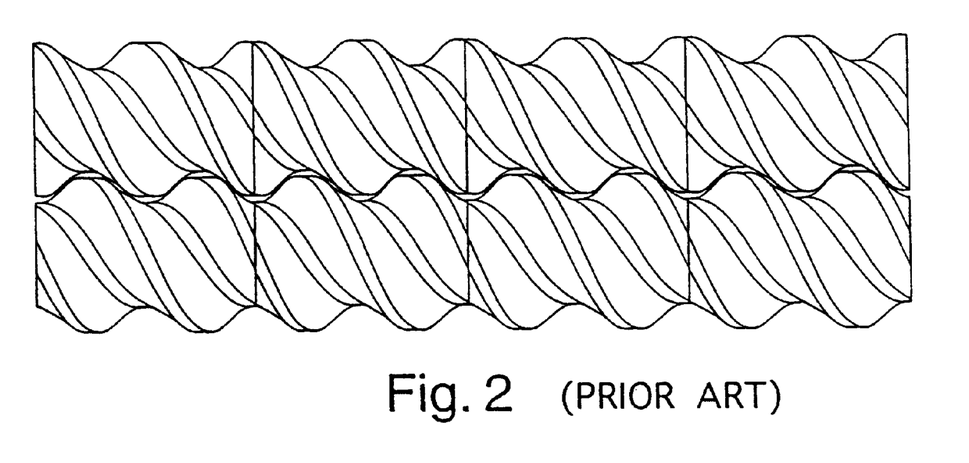
FIG. 2 is a side, plan view of a pair of conventional intermeshing screws.

Aspects of a multiple-screw extruder which have no direct analogy in a single-screw extruder pertain to the location, relative to each other, of the several screws within the barrel. Two screws in a multiple-screw extruder are said to be intermeshing if a flight of one screw is disposed within a channel of the other screw. In such configuration, the distance between the axis of each screw is less than the sum of the respective radii of the two screws, when each radius is measured from the axis to the top of the tallest or highest flight of the screw. A pair of conventional intermeshing screws is shown in FIG. 2. When, on a pair of screws, a flight has a shape and size such that its fit into a channel in which it is intermeshed is close enough that essentially no extrudable material passes between the flight and channel, the screws are said to be conjugated. Otherwise, the screws are said to be non-conjugated, and the degree of intermeshing in the case of non-conjugation can be varied to an essentially unlimited extent. If the screws rotate in the same direction, i.e. both clockwise or both counter-clockwise, they are said to be corotating. If not, they are said to be counterrotating.

When two counter-rotating screws are conjugated, there is little or no opportunity for polymeric material which is being extruded to remain in a channel of either screw in the region in which the screws intermesh. This is a result of the minimal clearance of the flight of one intermeshing screw within the channel of the other screw. Screws which are arrayed in such manner are said to "wipe" each other because polymeric material which is carried in the channel of either screw will be prevented from remaining in that channel over a distance of more than one turn of the screw by the obstacle which the intermeshing flight represents. In this configuration, most, if not essentially all, of the polymeric material resides in the portion of the channel on the top, bottom and outside (non-intermeshed side) of each screw, and the material consequently experiences significantly more movement in the downstream direction, parallel to the screw axis, than it does in a lateral direction, perpendicular to the axis. This arrangement results in efficient pumping of the polymeric material in the downstream direction, but does not achieve optimum intermixing of the whole body of polymeric material present in the extruder. Conversely, counter-rotating screws which are non-conjugated are characterized by greater clearance between an intermeshed flight and the corresponding channel. This allows greater space for polymeric material to reside in the channels of both screws in the region of intermeshing. Intermixing of the polymeric materials is enhanced by this concentration of the action of both flights in such a confined space, however some efficiency of pumping is lost.

Corotating screws, even when conjugated, allow for extensive movement of polymeric material laterally from one screw to the other. Mixing is benefited by this movement around the "equivalent screw", and it is further enhanced when the screws are not conjugated. The shape of the flights on non-conjugated screws may be arranged to create the passage of polymeric material from one channel into two channels on another screw. Or, when screws are conjugated, or essentially conjugated, certain flights can be designed in a shape such that they wipe each other in the zone of intermeshing but do not wipe the wall of the barrel. For example, a multiple-screw, barrier-type extruder is disclosed in U.S. Pat. No. 4,300,839 in which one or more flights on each screw is reduced in height by an amount which is constant along the entire length of the screw, and which is sufficient to allow the passage of resin between the two channels on either side of any such flight. This clearance between the wall and the top of the flight does not exist, however, for those flights in the zone of intermeshing. Designs such as these appear to provide thorough mixing, but considerations of pumping efficiency and residence time sometimes limit their usefulness.

Nichols et al disclose in *Modern Plastics*, Volume 61 at Page 70 (February, 1984), that dissipative mixing can be attained in a counter-rotating tangential twin-screw extruder by staggering the screw flights. Unfortunately, this technique appears to have no application beyond the field of tangential (i.e. non-intermeshing) extruders because the flights of conventional intermeshing screws may be considered, in this context, to be "staggered", at least to some extent, in the sense that they could not intermesh if a flight on one screw was not paired with a channel on the other screw rather than another flight.

It would therefore be beneficial to have a design for two intermeshing screws to be paired in a multiple-screw extruder to simultaneously obtain both a desirably high degree of intermixing, and a high rate of pumping, of extrudable material. It is consequently an object of this invention to provide a multiple-screw extruder in which even conjugated screws will furnish a desirably high level of compositional homogeneity and process stability.

SUMMARY OF THE INVENTION

In one aspect, this invention involves a multiplescrew extruder which has
 (a) a first screw about the root of at least one segment of which are disposed flight(s), the number of which flight(s) is x; and
 (b) a second screw about the root of at least one segment of which are disposed flight(s), the number of which flight(s) is x';
wherein the flight(s) on each x-flighted segment of the first screw are intermeshed with the flight(s) on a x'-flighted segment of the second screw, and x is not equal to x'.

In a further aspect, this invention involves a multiple-screw extruder which has
 (a) a first screw having a flighted segment about the root of which a flight does not terminate or begin or is not discontinuous; and
 (b) a second screw having (i) a partially flighted segment about the root of which are disposed one or more flight(s) which begin, terminate or are discontinuous, or (ii) a non-flighted segment about the root of which are disposed no flights;
wherein each flighted segment of the first screw is paired with a partially flighted or a non-flighted segment of the second screw.

In yet another aspect, this invention involves a multiple-screw extruder comprising
 (a) a first screw (i) about the root of at least one segment of which are disposed flight(s), the number of which flight(s) is x; and (ii) about the root of at least one other segment of which are disposed flight(s), the number of which flight(s) is z; and
 (b) a second screw having at least two segments both of which are either (i) a partially flighted segment about the root of which are disposed one or more flight(s) which begin, terminate or are discontinuous, or (ii) a non-flighted segment about the root of which are disposed no flights;
wherein each x-flighted segment and each z-flighted segment of the first screw is paired with either a partially-flighted or a non-flighted segment of the second screw; and x is not equal to z.

In yet another aspect, this invention involves an extruder screw comprising a root about one or more segments of which are disposed x flight(s), and about one or more segments of which are disposed z flight(s), wherein x is 1, 2 or 3 and z is 1, 2, 3, 4 or 5, but not equal to x.

In yet another aspect, this invention involves a method of extrusion in which the above described screw or any of the above described extruders is used to extrude an extrudable material, such as polycarbonate.

In yet another aspect, this invention involves the use of the above described screw or any of the above described extruders in a method of reducing vent flow in an extruder.

DETAILED DESCRIPTION OF THE INVENTION

Figure 3:
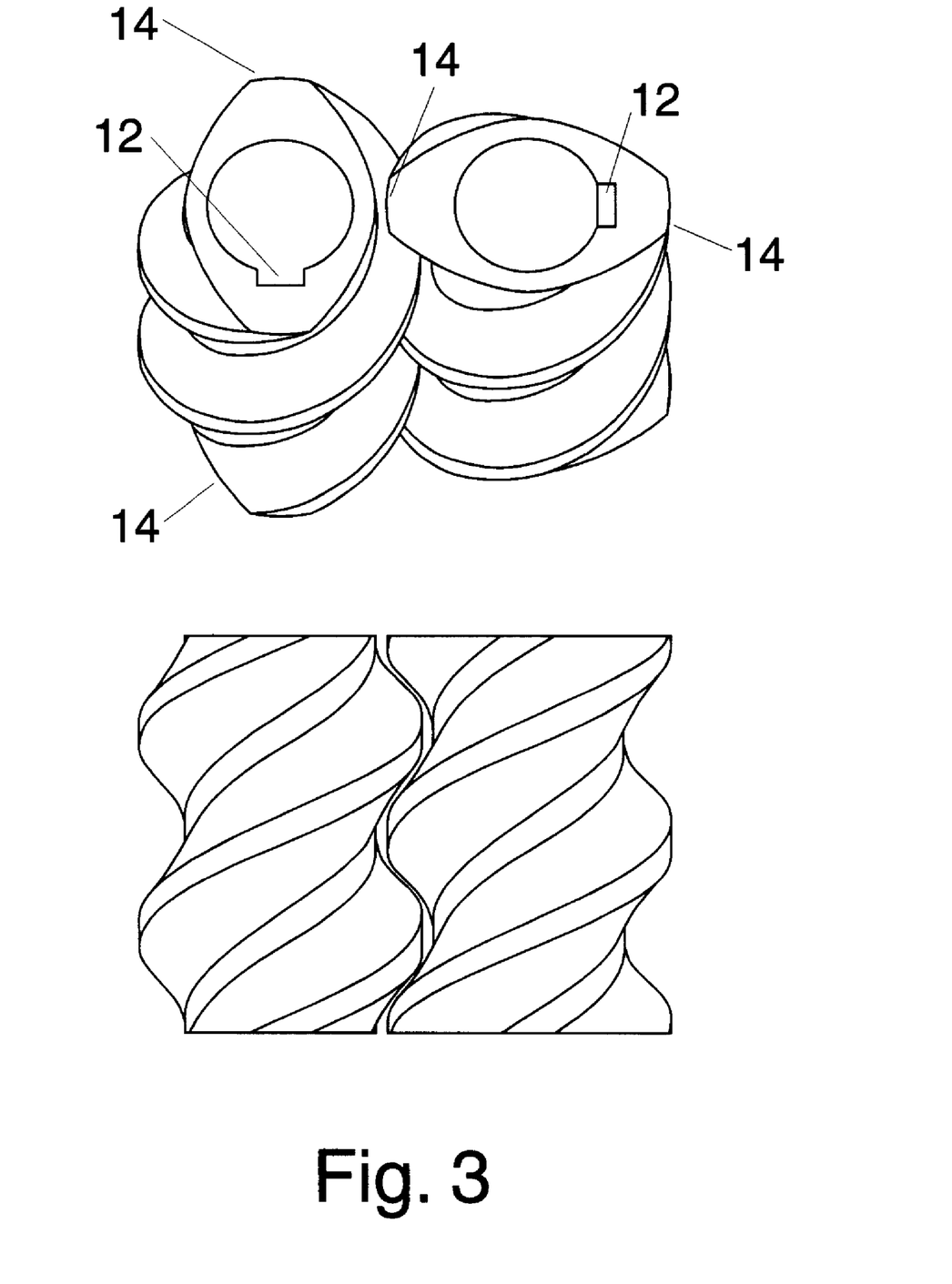
FIG. 3 shows side and end views of 2-flighted screw elements.

A screw for use in the multiple-screw extruder of this invention may be a single, continuous piece of metal. A screw formed from a single, continuous piece of metal is characterized by the fact that it cannot be transformed into a group of shorter sections except by means, such as cutting with a saw or torch, which would produce the shorter sections in a condition not allowing for their reassembley into exactly the same original screw. Alternatively, a screw for use in the multiple-screw extruder of this invention may be assembled from several separately manufactured screw elements, each of which forms just a portion of the screw as actually operated. These screw elements are disposed in head-to-toe fashion in the appropriate sequence on an axial shaft to form a "stack", and are held in place as the shaft rotates by a system of splines and keyways and a locking nut at the end of the shaft. In FIG. 3, screw elements are shown having a keyway 12, in which a spline on a screw shaft would be inserted, and lobes 14.

A screw that is a single, continuous piece of metal may be regarded as being constituted of various segments. Although, as noted above, these segments are not separable physically, each of them may possess the same or a different number of flights, may possess a flight discontinuity, or may possess no flights at all. The length of a segment of a screw that is a single, continuous piece of metal is typically at least about 0.50 turn of a continuous (i.e. uninterrupted) flight, but may be any distance in the range of less than about 0.25 to 10 or more turns, and it is preferably about 1 to 6 turns, is more preferably about 1 to 4 turns, and is most preferably 1, 2, 3 or 4 turns. Similarly, the various elements from which a screw stack may be assembled may each contain the same or a different number of flights, may possess a flight discontinuity, or may contain no flights at all. When a screw is assembled as a stack of elements, a segment of such screw may be constituted of a portion of one, one, or more than one such element. A segment on a screw stack is frequently about 1 to 6 elements in length, is preferably about 1 to 4 elements, and is more preferably 1, 2, 3 or 4 elements in length.

Within one or more such segment(s) of a screw, whether the screw is a solid, continuous piece of metal or is assembled as a stack of screw element(s), (a) the number of flights may change one or more times;

(b) one or more flights may terminate, begin, or become discontinuous [(by terminating and then later resuming), i.e. the segment is partially flighted]; or (c) there may be no flights at all (i.e. the segment is non-flighted).

Instead of flights, a segment may contain non-continuous mixing elements such as kneading blocks or gear mixers. A segment on a screw containing flights may be upstream or downstream from a partially flighted segment, a non-flighted segment, or a segment containing such non-continuous mixing elements.

Figure 4:
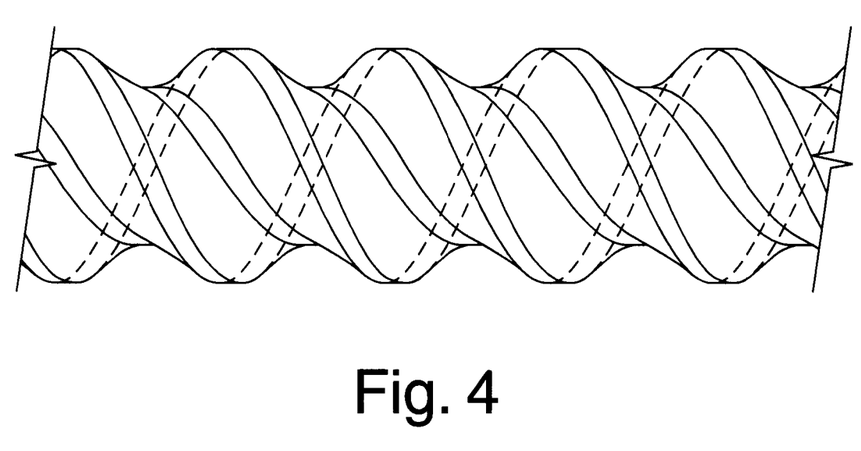
FIG. 4 shows a side, plan view of a portion of a dual-flighted (i.e. 2-flighted) screw.
Figure 5:
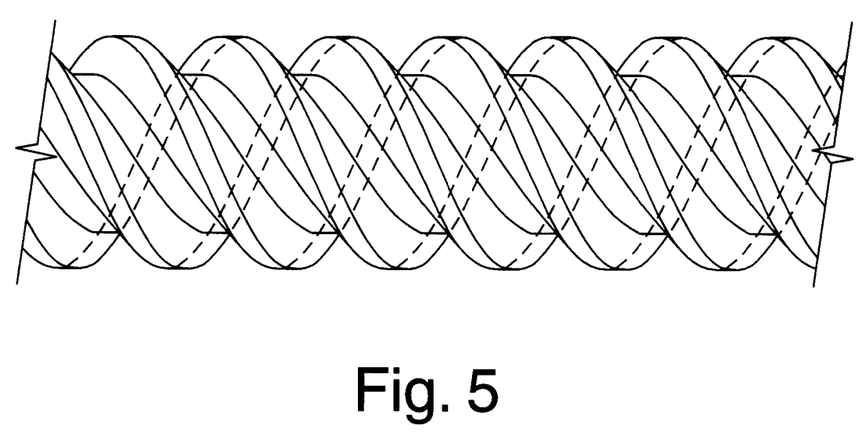
FIG. 5 shows a side, plan view of a portion of a 3-flighted screw.

It is preferred, in the multiple-screw extruder of this invention, that at least one screw be employed which has, either throughout its entire length, or in one or more segment (s) thereof, more than one flight, for example 2 or 3 flights. A portion of a dual-flighted screw is shown in FIG. 4, and a portion of a 3-flighted screw is shown in FIG. 5. Screws with more than 3 flights are not typical, but are known and may be used in the multiple-screw extruder of this invention.

In a multiple-screw extruder, the intermeshing of screws is described with respect to a pair of (two) screws. Segments of intermeshing screws which occupy the same longitudinal position relative to the full length of the axis of the barrel of the extruder are said to be paired. In the past, the practice has been to arrange intermeshing screws, or segments of paired screws which intermesh, such that the number of flights on each screw which intermesh (that is, the number of lobes) is equal. In the multiple-screw extruder of this invention, one or more screws is designed such that the number of flight(s) on the entire length of a first screw, or on a segment thereof, which intermesh with flight(s) on a second screw, or on a segment thereof, is not equal to the number of flight(s) on the entire length of the second screw, or on the intermeshing segment thereof. The two paired screws (or segments) may be said in this situation to have a mixed lobe count. Alternatively, a flighted segment of a first screw may be paired with a partially flighted or a non-flighted segment of a second screw. For example, the number of flights on the first screw (or on one or more segment thereof may be 1, 2, 3, 4 or 5, and the number of flights on the second screw (or on one or more segment thereof may be a different number selected from 0, 1, 2, 3, 4, 5 or 6. The number of flights on the second screw, or on one or more segment thereof, may be greater or less than the number of flights of the first screw, or on one or more segment thereof, by 1, 2, 3, 4 or 5. Pairings of numbers of flights on intermeshing screws such as 1 and 2, 1 and 3, and 2 and 3 are preferred.

When a flighted segment of one screw is paired with a partially flighted or a non-flighted segment of another screw, the distance over which such pairing occurs is typically at least about 0.50 turn of the flighted segment, but may be any distance in the range of less than about 0.25 to 10 turns, and it is preferably about 1 to 6 turns, is more preferably about 1 to 4 turns, and is most preferably 1, 2, 3 or 4 turns.

A particular screw (a "first screw") may contain more than one segment which intermeshes with a paired segment on a second screw where the paired segment on the second screw has an unequal number of flights (or lobes) or is partially or non-flighted. This plurality of segments on the first screw may themselves contain different numbers of flights, and they may be arranged in any order. The various segments on either screw may be adjacent to each other, or may be separated from one another by intervening segments. The term "adjacent" as used here means immediately next to along the longitudinal axis of a screw.

When the number of flights on a particular segment or screw is being contrasted with the number of flights on a paired segment or screw, or on an adjacent segment, the notation "x", "x'" or "z'" may be used to refer to the number of flights on the segment(s) or screw(s) in question, but the actual value of such number of flights may be unspecified other than to state that it lies within a certain range or may be determined by a mathematical calculation. A reference to a screw or segment as being "x-, x'-, z'- or z-flighted" indicates that the screw or segment contains x , "x'", "z'" or z flights. For example, on a first screw, a segment which has x flights may be adjacent to, or may be axially (longitudinally) separated from, a segment on the same screw which has z flights, where x and z may each be 1, 2, 3, 4 or 5, but x is not equal to z. An x-flighted segment might have a z-flighted segment adjacent at each of its ends; or, a plurality of x-flighted segments and a plurality of z-flighted segments may alternate in succession such that no x-flighted segment is adjacent to another x-flighted segment and no z-flighted segment is adjacent to another z-flighted segment.

Both an x-flighted segment and a z-flighted segment on a first screw may be intermeshed with an x'-flighted segment and a z'-flighted segment; on a second screw, respectively where x does not equal z, and x' and z' are independently; 0, 1, 2, 3, 4, 5 or 6. Z' may or may not equal z and x' does not equal x. When z' does equal z, only the x-flighted segment(s) exhibit a mixed lobe count with reference to the x'-flighted segment(s). The value of x' for the segment which is intermeshed with the x-flighted segment may or may not be equal to the value of z' for the segment intermeshed with the z-flighted segment. For example, a 2-flighted segment (where x is 2) on a first screw may have a 1-flighted segment (where z is 1) adjacent at each of its ends. On a second screw, a 2-flighted segment (where z' is 2) may be intermeshed with each of the 1-flighted segments ("z" segments) on the first screw, and a 1-flighted segment (where x' is 1) on the second screw may be intermeshed with the 2-flighted segment ("x" segment) on the first screw. In this instance, unequal numbers of flights are intermeshed (there is a mixed lobe count) at each pairing of segments, and x' is not equal to x, z' is not equal to z and does not equal z '. Pairings of numbers of flights such as x and/or z=1 and x'=z'2; x and/or z=1 and x'=z'=3; and x and/or z=2 and x'=z'=3 are preferred.

Figure 6:
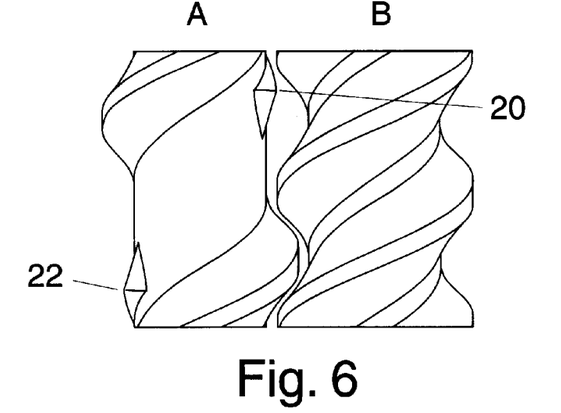
FIGS. 6–16 contain a sequence of views of intermeshing segments of two corotating screws as they rotate through a complete turn.
Figure 7:
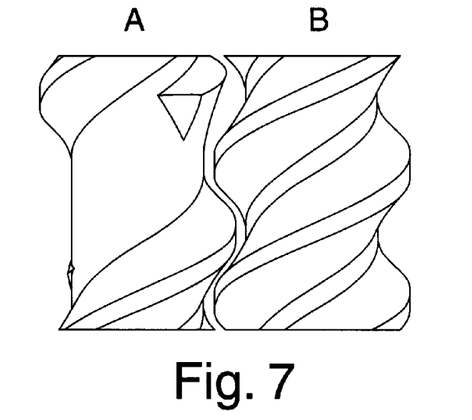
Figure 8:
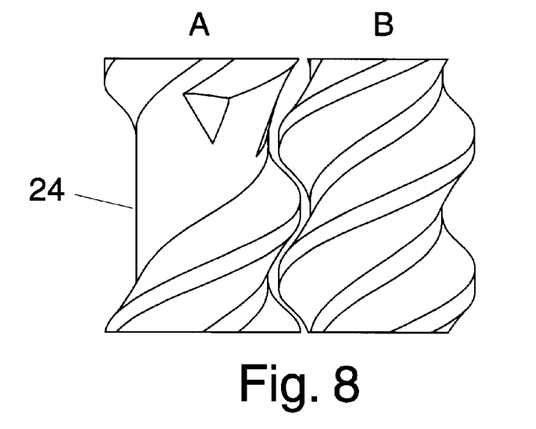
Figure 9:
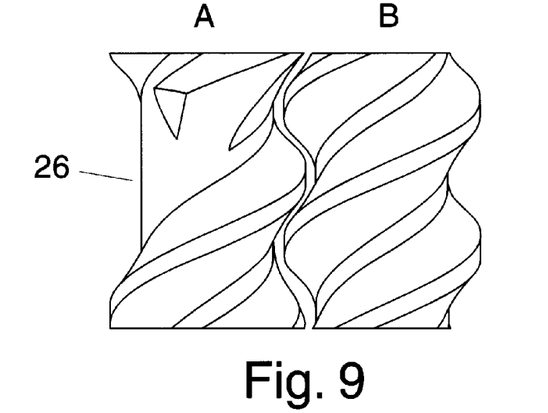
Figure 10:
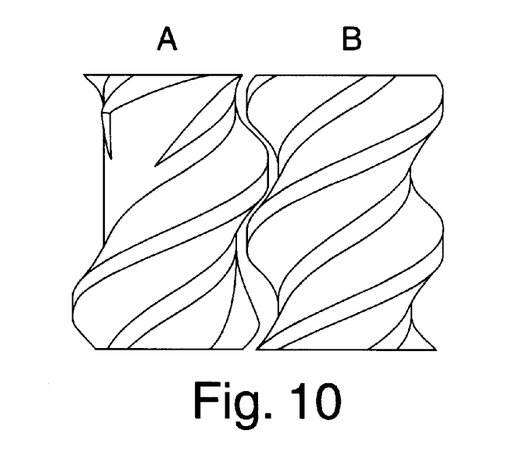
Figure 11:
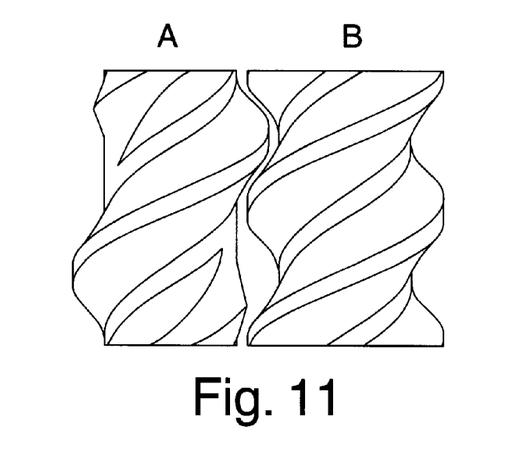
Figure 12:
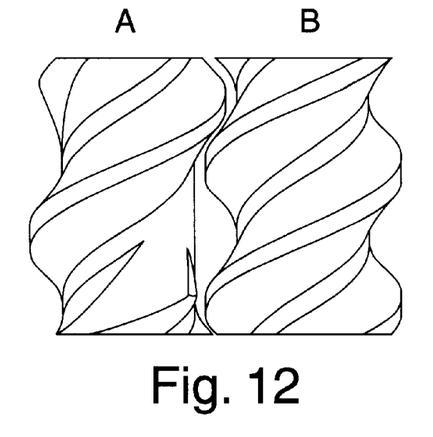
Figure 13:
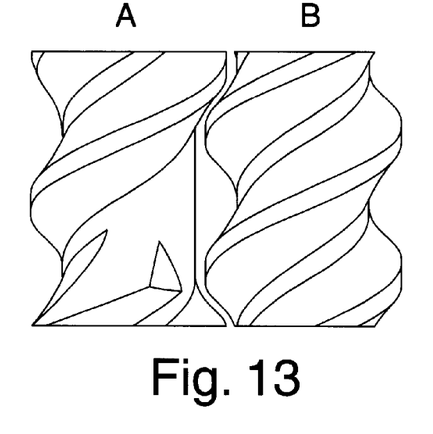
Figure 14:
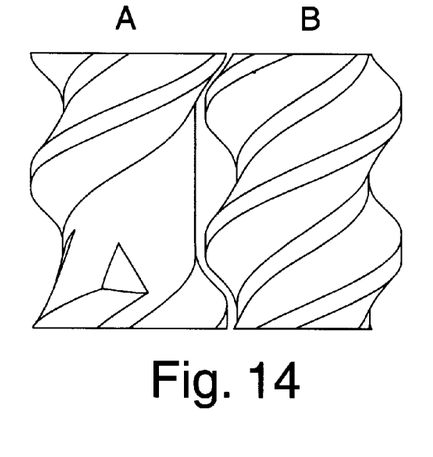
Figure 15:
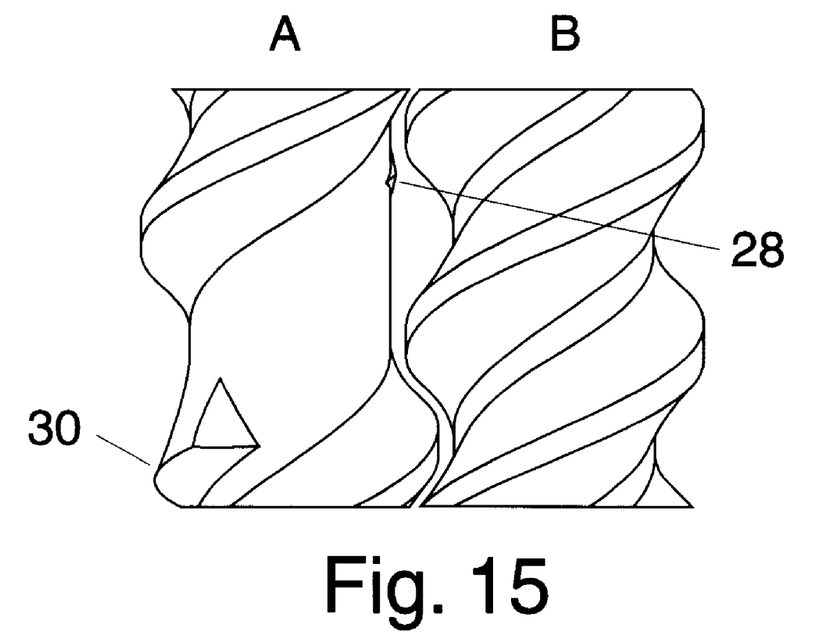
Figure 16:
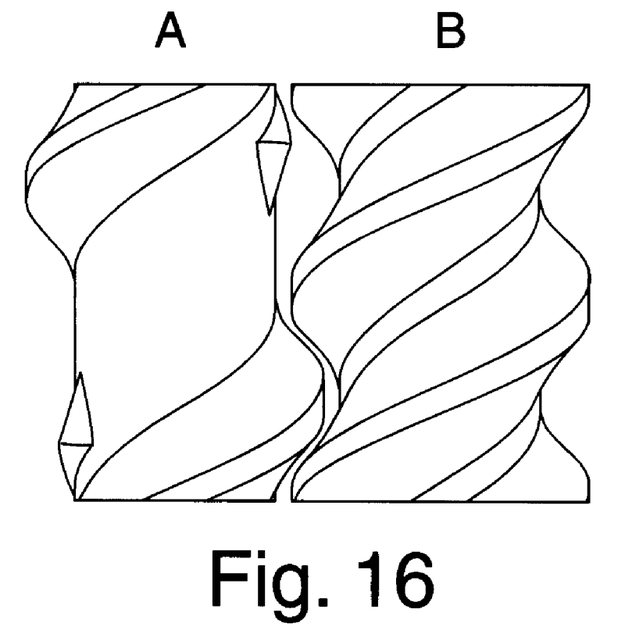

To illustrate one possible embodiment of the invention, FIGS. 6–16 contain a sequence of views of intermeshing segments of two corotating screws as they turn from right to left. The view in each figure represents, in succession, one tenth of a turn of each screw. The screw on the right ("Screw B") has 2 continuous flights. The screw on the left ("Screw A") has one continuous flight and a second flight which is discontinuous. In FIG. 6, the gap or void between the screws results from the fact that the discontinued portion of the discontinuous flight on Screw A is in the process of completing its rotation through the zone of intermeshing with Screw B. The discontinuous flight terminates at about 20 and resumes at about 22, in terms of a top-to-bottom direction of travel of the flight. The gap narrows in FIG. 7, and the screws are essentially conjugated in FIGS. 8–10, as Screw A rotates into a position in which the flight which is not discontinuous rotates through the zone of intermeshing. The absence of a flight in the discontinued portion of the discontinuous flight on Screw A may be seen at about 24 in FIG. 8 and at about 26 in FIG. 9. The gap between the screws begins to reappear in FIG. 11 as the discontinued portion of the discontinuous flight on Screw A begins to rotate back into the zone of intermeshing. This process continues until the gap between the screws reaches its greatest size when the discontinued portion of the discontinuous flight on Screw A is directly in or very close to the zone of intermeshing, as seen in FIGS. 13 and 14. The gap begins to decrease in size again in FIG. 15 as the point at which the discontinuous flight terminates 28 begins to rotate back into the zone of intermeshing, and the point at which the discontinuous flight resumes 30 rotates further away from Screw B. FIG. 16 shows the screws after a full 360° rotation to the same position as shown in FIG. 6.

The discontinued portion of the discontinuous flight on Screw A is shown in FIGS. 6–16 over a distance of one turn for the purpose of illustration. However, a 2-flighted segment of Screw B could be paired with a segment of Screw A which possesses a flight discontinuity over any desired distance on the screw, thus providing a regularly repeating sequence of the gap or void which grows and diminishes as the discontinued portion of the discontinuous flight on Screw A rotates through the zone of intermeshing with Screw B. Moreover, unequal lobe counts other than 1 and 2 may be selected, as described above; or a discontinuity may exist for a distance of less than one turn, or a distance in the range of from less than about 1 turn (e.g. 0.25 or 0.50 turn) to 10 turns, preferably about 1 to 6 turns, more preferably about 1 to 4 turns, and most preferably 1, 2, 3 or 4 turns, with reference to a continuous flight on the same or a paired screw.

Figure 17:
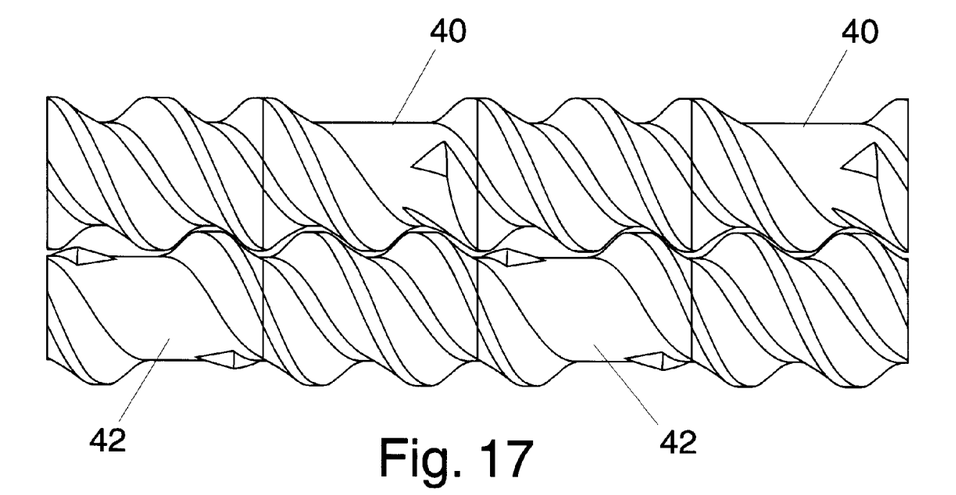
FIGS. 17–20 contain a sequence of views of intermeshing segments of two corotating screws as they rotate through a partial turn.
Figure 18:
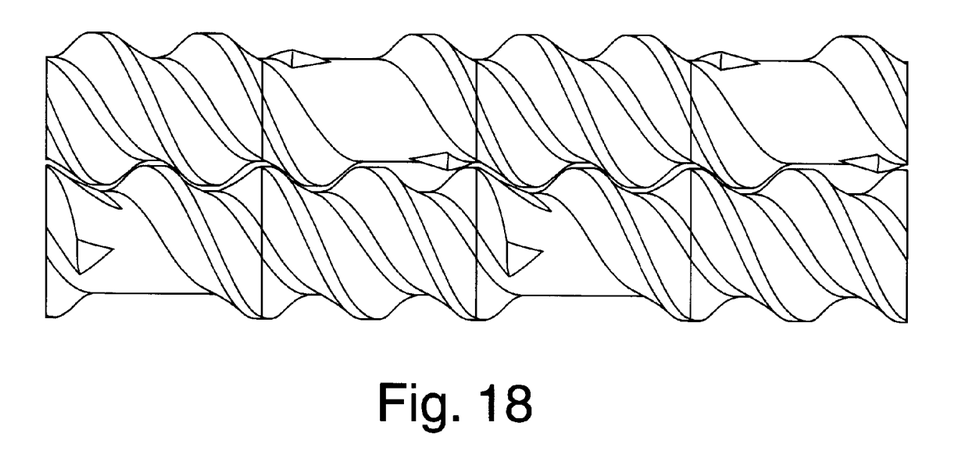
Figure 19:
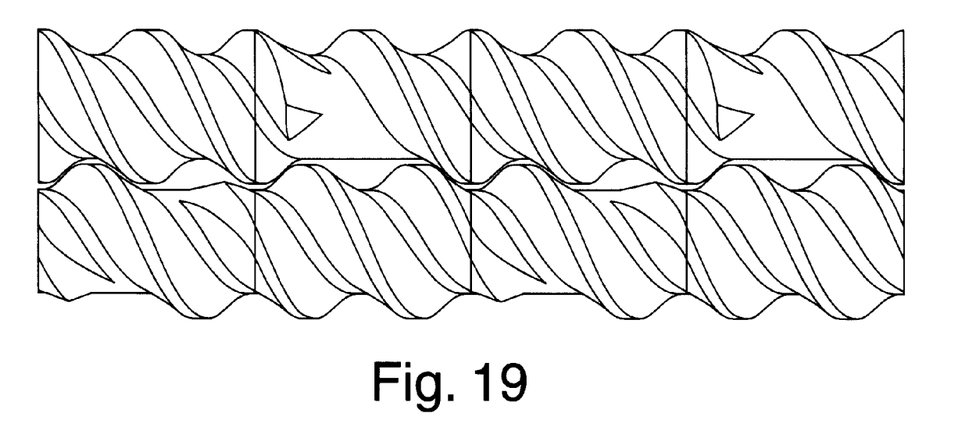
Figure 20:
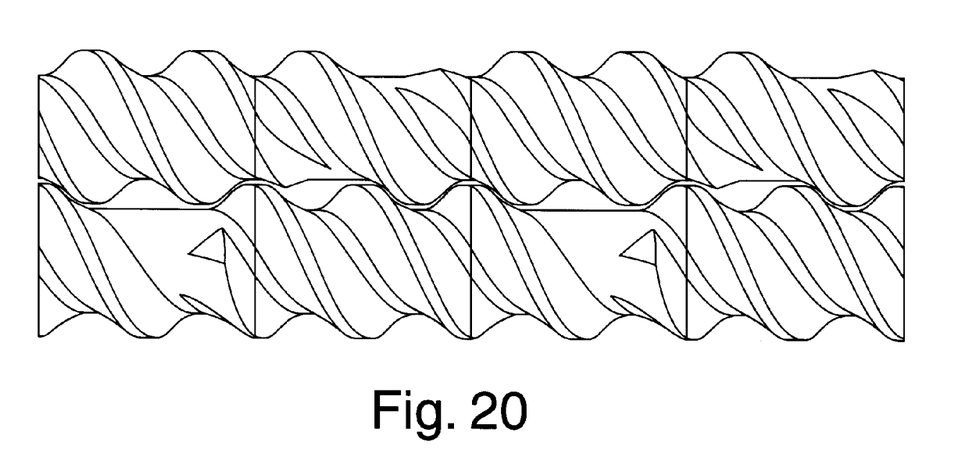

The effect of a flight discontinuity on paired segment(s) of screws may also be seen in FIGS. 17–20. Both screws are rotating out from the plane of the page, and FIGS. 18–20 each represent, successively, a quarter turn from the starting position in FIG. 17. In FIG. 17, a flight discontinuity 40 is facing up on the top screw in two locations, and a flight discontinuity 42 is facing out from the plane of the page in two locations on the bottom screw. In FIG. 18, the discontinuities are facing out on the top and down on the bottom. In FIG. 19, the discontinuities are facing down on the top and into the plane of the page on the bottom. In FIG. 20, the discontinuities are facing into the plane of the page on the top and up on the bottom. It can be seen from these figures that, in the zone of intermeshing, the point of entry for extrudable material to the gap or void between the screws created by a flight discontinuity on a screw is cyclically shifted forward or rearward on the screw axis by the rotation of the screw. This allows for flow stream redirection and the movement of extrudable material from a first channel to one or more other channel(s), and such other channel(s) need not be adjacent to, or on the same screw as, the first channel.

When segments on a particular screw have different numbers of flights, or when one or more segments is non-flighted (i.e. the segment contains no flights), the screw is partially flighted at the location where a flight begins or terminates. At such location, the beginning or termination of a flight may be constructed in the form of a taper. A flight is tapered when its height is gradually increased, starting at its point of origin, out of and away from the surface of the root of the screw, or is gradually reduced until, at its point of terminus, it merges with the surface of the root of the screw. A taper may take the form of a straight line and be shaped as a fin, or it may be shaped as a curved surface. When a flight is tapered into or out of the surface of the root of a screw, the size of the angle at which the flight actually emerges from or merges with the root, whether the taper in its gross dimension has the shape of a fin or a curved surface, may be in the range of from greater than 0° to less than 90°. Typical angles of taper have a size in the range of from about 40° to less than 90°. When a flight is tapered into or out of the root of the screw and is, for that reason, not of sufficient height at that location to slidably contact the interior wall of the barrel of the extruder, the discontinuity created by the tapering of that flight will also create, in the zone of intermeshing, a gap or void between the screw containing the discontinuous flight and the paired screw(s). Alternatively, a flight may abruptly begin or terminate at its full height, forming a 90° angle with the root.

Figure 21:
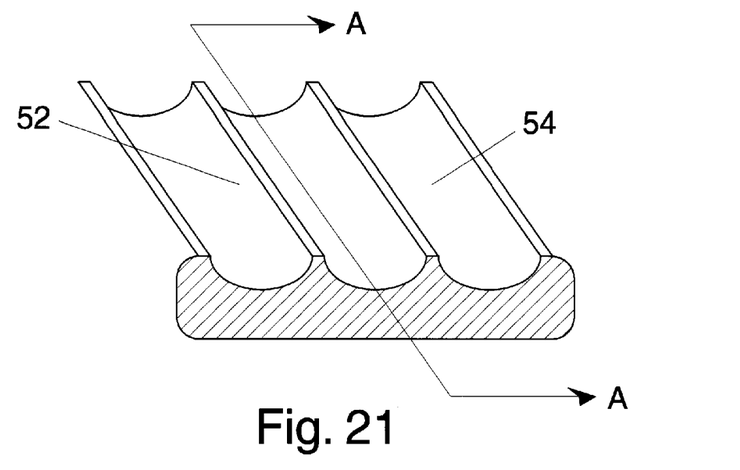
FIG. 21 shows a segment of a 3-flighted screw in which the circumference of the segment has been laid out flat.
Figure 22:
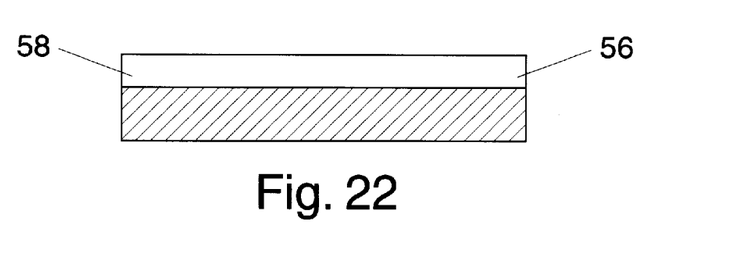
FIGS. 22–24 show the cross section A—A of a flight of the screw shown in FIG. 21.
Figure 23:
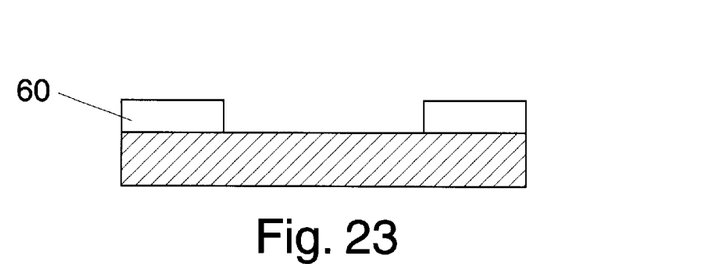
Figure 24:
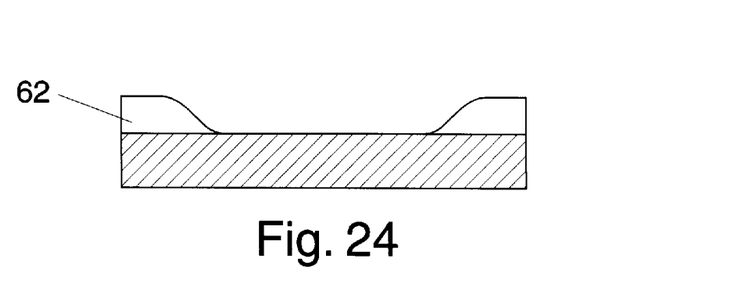
Figure 25:
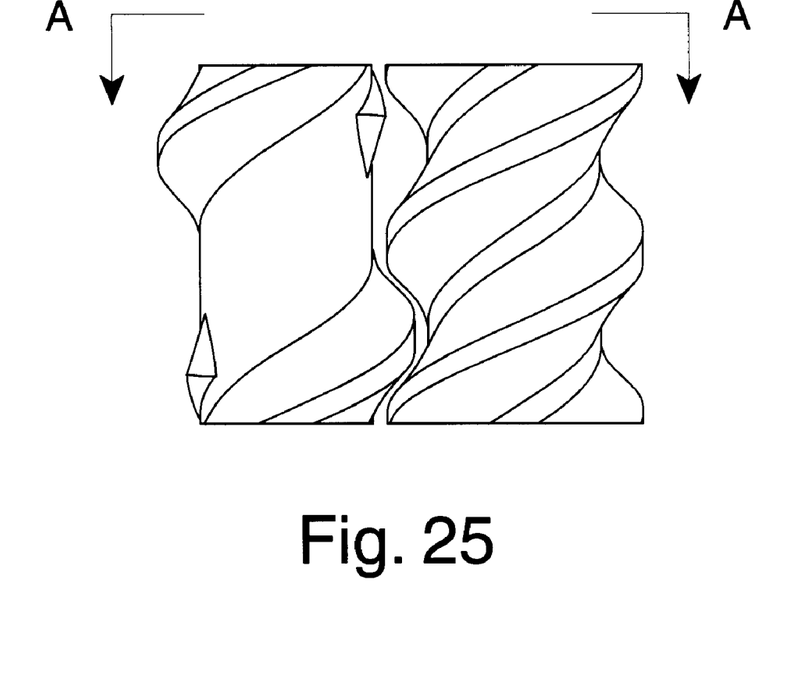
FIG. 25 shows a perspective view of paired screw elements, on one of which a flight terminates and resumes.
Figure 26:
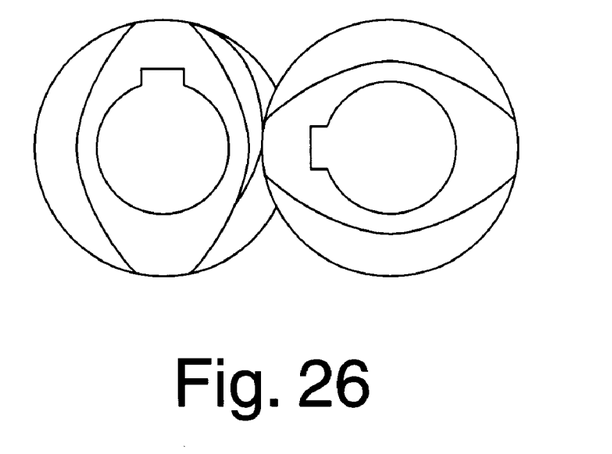
FIG. 26 shows the cross section A—A of the screw in FIG. 25.

For example, in FIG. 21, a segment of a 2-flighted screw is shown with the full circumference of that segment laid out flat. Both flight 52 and channel 54 are shown. In FIGS. 22–24, the cross section A—A of possible designs of a flight in FIG. 21, either full height or discontinuous, is shown. In FIG. 22, the flight 56 is continuous above the root 58. In FIG. 23, the flight 60 terminates and resumes at a 90° angle. In FIG. 24, the flight 62 terminates and resumes in a taper. The beginning or termination of a flight may occur at an end, or at any point between the ends, of a segment of a screw. The termination and resumption of a flight, and the resulting discontinuity in the flight, by tapering the flight into and out of the root of a screw is shown in perspective on the screw element on the left in FIG. 25. In FIG. 26, the discontinuous nature of the flight in question is shown in the A—A cross section from FIG. 25.

Constructing a multiple-screw extruder with screws which have intermeshing segments in which there are unequal numbers of flights produces a surprising improvement in both the mixing and melting capability of the extruder. The gaps or void between paired screws resulting from the absence of at least one flight from one of the screws creates flow field rearrangement and higher degrees of fill in a screw channel that is not bounded by a discontinuous flight. This yields an increased level of mixing and heat transfer between the melted and solid phases of a partially molten system of polymeric material. Benefits of this are lower melt temperatures and increased thermal and compositional homogeneity during processing. The relative pumping efficiency of the screw is increased by having a lower temperature, higher viscosity fluid through which to transfer mechanical energy. The additional pumping efficiency combined with the unique flow patterns and material flow characteristics result in a significant reduction in the tendency for some polymers to vent flow during devolatilization operations.

This opportunity to use mixed-lobe-count screws to reduce or eliminate extruder vent flow is particularly beneficial when additives, such as a filler or processing aid, are being compounded with a polymeric resin. For example, when glass is being compounded with polystyrene, it has been found that at least twice as much glass, by weight, can be successfully mixed with polystyrene without experiencing undesirable levels of vent flow when mixed-lobe-count screws are used, as compared to a conventional multiple-screw extruder such as shown in FIG. 2. Use of mixed-lobe-count screws in an extruder of this invention thus provides a method of reducing extruder vent flow to less than about one percent of the extruder through-put rate, preferably to less than about 0.5 percent, more preferably to less than about 0.25 percent, and most preferably results in the substantial elimination of vent flow.

The invention is exemplified by a trial in which a polymeric blend was made by compounding a mixture of 21 weight percent ploycarbonate flake, 49 weight percent polycarbonate pellet and 30 weight percent acrylonitrile/butadiene/styrene copolymer on a Berstorff 40 mm twin-screw corotating extruder at a rate of 136 kg/hour. One run was made in which all intermeshing segments of the two screws had an equal lobe count. A second run was made in which, over a portion of their length, the screws had an unequal lobe count. In that portion, the first screw had a sequence of segments containing, respectively, 1, 2, 1 and 2 flights, and the second screw had a sequence of segments which intermeshed with the 4 described segments of the first screw but contained, in the same order, 2, 1, 2 and 1 flights, respectively. The results of these two compounding runs are shown in the table below:

|  | Equal Lobe Count | Unequal Lobe Count |
| --- | --- | --- |
| Processing range, rpm | 295–345 | 205–345 |
| Melt temperature, °C. | 270 | 247 |
| Motor load, amps | 48 | 37 |
| Specific energy, kJ/kg | 460 | 350 |

This data demonstrates that mixed-lobe pairs can be used to improve energy transfer and melting in polymer systems. This leads to lower energy consumption, lower melt temperatures, and a broader, more stable processing window.

Virtually any extrudable material which will flow may be mixed or conveyed in the multiple-screw extruder of this invention. For example, various polymeric materials may be plasticated by melting or heat softening for mixing or conveying, or may be subjected to other operations in the multiple-screw extruder of this invention such as reaction or devolatilization. The presence of reactive species in the extrudable material may result in reactions such as polymerization, graft polymerization, branching or chain scission. The following are exemplary of polymers and copolymers, or alloys or blends of two or more thereof, which are suitable for such plastication, but this listing is not intended to be exhaustive or to limit the scope of this invention:

polyacetal, including that which is formed by the bond opening and polymerization of the carbonyl group of an aldehyde to give a —(—$CH_2$—O—)— repeating unit, as well as the reaction products of polyols and aldehydes;

polyacrylamide;

polyacrylate;

polyacrylonitrile;

polyamide;

polyarylate poly(arylene sulfide), including that which is prepared by the reaction of p-dichlorobenzene with $Na_2S$ in a polar organic solvent to give a —(—$_p$Ar—S—)— repeating unit;

azo polymers, including those which are prepared by the polymerization of an azobutyronitrile with a diamine or diol to give a —(—R—N=N—R—)— repeating unit or those prepared by polymerization of monomers containing an azo side group in addition to a polymerizable functionality to give a -[-R(N=N-R')-]- repeating unit;

polybenzimidazole, including that which is prepared by condensation of aromatic tetraamino compounds with dicarboxylic acids;

polycarbonate, including copolymers thereof;

poly(cyclo hexane);

polyester, including copolymers thereof;

poly(ethylene oxide);

polyimidazole, including that which is prepared by polymerization of vinylimidazole monomer;

polyimide, including that which is prepared by condensation of bifunctional carboxylic acid anhydrides with a diamine to give a —[—C(O)—N—R—C(O)—]— repeating unit;

poly(lactic acid);

poly(methyl methacrylate)

polyolefin, including copolymers thereof;

poly(phenylene ether), including that which is prepared by the oxidative coupling polymerization of a phenol to give a —(—$_p$Ar—O—)— repeating unit;

polyphosphazine, including that which is prepared by the polymerization of the cyclic trimer produced by the reaction of phosphorous pentachloride and ammonium chloride to give a —[—N=P($R_2$)—]— repeating unit;

poly(propylene oxide);

polyquinoxaline, including that which is prepared by the solution polymerization of aromatic bis($_o$diamine) and bis(glyoxal hydrate);

polysilane;

polysiloxane;

polystyrene (for example, syndiotactic polystyrene), including copolymers thereof;

polysulfone;

polyurea;

polyurethane; and vinyl polymers, including poly(vinyl acetate), poly(vinyl alcohol), poly(vinyl amide), poly(vinyl chloride), and poly(vinyl ether), and including copolymers of each;

where, in any of the above formulae, R and R' are organic (e.g. $C_1$–$C_{20}$) radicals, and Ar is an aromatic organic (e.g. $C_6$–$C_{10}$) radical.

This invention is also applicable to copolymers formed from two or more monomers or co-monomers, such copolymers including but not being limited to:

acrylonitrile/butadiene/styrene copolymer, acrylonitrile/EPDM/styrene copolymer where EPDM is ethylene/propylene/diene rubber, acrylonitrile/styrene/alkyl acrylate copolymer, poly(ester/carbonate) copolymer, ethylene/carbon monoxide copolymer, ethylene/styrene interpolymer, ethylene/vinyl acetate copolymer, methyl methacrylate/butadiene/styrene/acrylonitrile copolymer, phenyl maleimide/acrylonitrile/butadiene/styrene copolymer, styrene/acrylonitrile copolymer, and styrene/maleic anhydride copolymer.

This invention is also applicable to blends and alloys of two or more polymers and/or copolymers, including blends or alloys which may be formed from polymers or copolymers such as those named above. Specific examples of useful blends or alloys are:

acrylonitrile/butadiene/styrene copolymer blended with polycarbonate, polyamide, polyester, or polyurethane;

polyacetal blended with polyurethane;

polycarbonate blended with polyamide, polyester, or styrene/acrylonitrile copolymer; and polyphenylene ether blended with (i) polyamide and a vinyl aromatic/conjugated diene di- or tri-block copolymer; (ii) polyester; or (iii) polystyrene to which can be grafted a vinyl aromatic/conjugated diene di- or tri-block copolymer.

What is claimed is:

1. A multiple-screw corotating extruder comprising:

(a) a first screw comprising more than one flight wherein one or more flights terminate, begin or are discontinuous providing a partially flighted segment for one or more distances along the first screw's longitudinal axis and (b) a second screw which rotates in the direction of the first screw comprising more than one flight wherein one or more flights terminate, begin or are discontinuous providing a partially flighted segment for one or more distances along the second screw's longitudinal axis wherein the screws are intermeshing and the number of flights on a partially flighted segment of the first screw is not equal to the number of flights on a corresponding segment of the second screw providing paired segments with a mixed-lobe-count and the number of flights on a partially flighted segment of the second screw is not equal to the number of flights on the corresponding segment of the first screw providing alternate paired segments with a mixed-lobe-count.

2. The multiple-screw extruder of claim 1 wherein the first screw comprises one or more discontinuities and the second screw comprises one or more discontinuities providing at least two alternating paired segments with mixed-lobe-count.

3. The multiple-screw extruder of claim 2 wherein said discontinuities independently exist for a distance from about 0.25 to about 10 turns with reference to a continuous flight on the same or paired screw.

4. The multiple-screw extruder of claim 2 wherein the discontinuities on the first screw are not adjacent to the discontinuities on the second screw providing at least one alternating pair of paired segments with mixed-lobe-counts.

5. The multiple-screw extruder of claim 2 wherein at least one discontinuity on the first screw is adjacent to at least one discontinuity on the second screw providing at least one adjacent, alternating pair of paired segments with mixed-lobe-counts.

6. The multiple-screw extruder of claim 5 wherein the first and second screws comprise two or more adjacent, alternating pairs of paired segments with mixed-lobe-counts.

7. The multiple-screw extruder of claim 6 wherein two or more adjacent, alternating pairs of paired segments with mixed-lobe-counts are adjacent.

8. The multiple-screw extruder of claim 1 wherein the first and second screws each have two or three flights.

9. The multiple-screw extruder of claim 1 wherein the first and second screws each have two flights.

10. The multiple-screw extruder of claim 1 wherein the number of flights for the first screw is not equal to the number of flights for second screw.

11. The multiple-screw extruder of claim 10 wherein the number of flights for the first screw is selected from the group consisting of 1, 2, 3, 4 and 5 and the number of flights for the second screw is a different number selected from the group consisting of 1, 2, 3, 4, 5 and 6.

* * * * *